May 5, 1931. H. M. STOLLER 1,804,126
REGULATOR SYSTEM
Filed Feb. 19, 1929
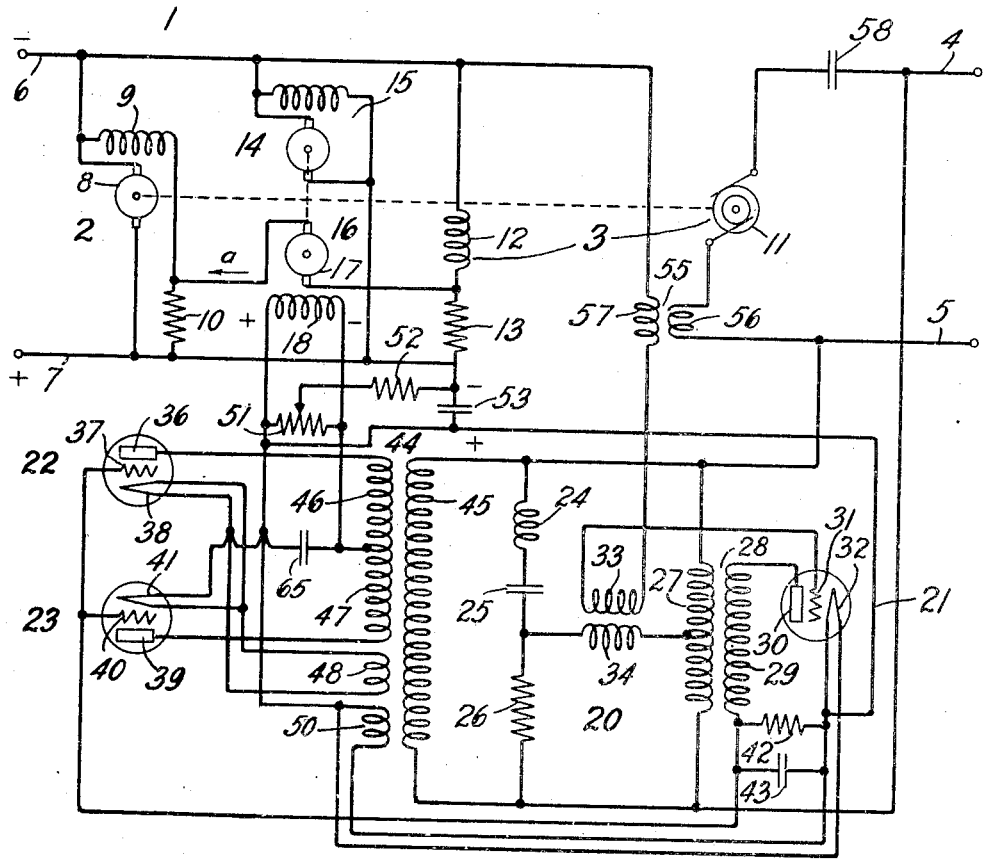
INVENTOR
H. M. STOLLER
BY Wayne B Wells
ATTORNEY Patented May 5, 1931

1,804,126

UNITED STATES PATENT OFFICE

HUGH M. STOLLER, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK

REGULATOR SYSTEM

Application filed February 19, 1929. Serial No. 341,233.

This invention relates to regulator systems and particularly to systems employing thermionic vacuum tubes for controlling alternating current generators.

One object of the invention is to provide a regulator system that shall maintain a characteristic of a generator substantially constant in an improved manner.

Another object of the invention is to provide a thermionic vacuum tube regulator system for a generator that shall compensate the regulator system according to the load on the generator.

A further object of the invention is to provide a regulator system for a motor-generator set that shall control a Wheatstone bridge circuit according to a characteristic of the generator to operate a thermionic tube system and simultaneously govern the motor and the generator to maintain the generator characteristic substantially constant.

In operating many devices by an alternating current it is desirable in many cases, as in operating an air oscillator for producing a constant sound, to hold the frequency of the alternating current substantially constant. When regulating an alternating current generator to produce a constant frequency current with precision it is desirable to stabilize the regulating operation and to compensate the regulating operation according to the load on the generator.

The regulator system disclosed to illustrate the invention employs a motor-generator set to produce an alterating current having a substantially constant frequency. A Wheatstone bridge circuit having one arm thereof tuned to the normal frequency of the generator has two opposite vertices connected across the generator circuit and the other two vertices connected to the input circuit of a thermionic phase-detector tube. Space current for the phase-detector tube is supplied from the generator circuit to obtain an output from the tube according to the phase relation between the current from the bridge and the generator current. A Wheatstone bridge circuit and a phase-detector tube combined in this relation is disclosed in the patent to H. M. Stoller, No. 1,711,661, dated May 7, 1929, and the patent to H. M. Stoller et al., No 1,756,573, dated April 29, 1930. A Wheatstone bridge of the type under consideration is also disclosed in the patent to H. M. Stoller, No. 1,695,035, dated December 11, 1928.

Two thermionic rectifier-amplifier tubes, which are connected in parallel circuit relation, are coupled to the phase-detector tube. The amplifier tubes are so coupled to the phase-detector tube as to effect inverse amplification. Preferably, alternating current is supplied to the amplifier tubes from the circuit of the generator.

An auxiliary motor-generator set having the armature of the generator connected in circuit with the field windings of the motor and the generator of the main motor-generator set is controlled by the two amplifier tubes. The auxiliary motor-generator set and the main motor-generator set operate similarly to the operation of the system disclosed in the patent to H. M. Stoller, No. 1,624,566, dated April 12, 1927. The two amplifier tubes control the field excitation of the generator in the auxiliary motor-generator set to govern the field excitation of the motor and the generator in the main motor-generator set.

In the system as described, the phase-detector tube is controlled by the Wheatstone bridge circuit in accordance with the frequency of the current produced by the main generator. The phase-detector tube by means of the two amplifier tubes controls the auxiliary motor-generator set to govern the field excitation of the motor and the generator in the main motor-generator set to maintain the generated frequency substantially constant. If the frequency of the main generator tends to rise above normal value the excitation of the main motor is increased to reduce the motor speed and thus prevent increase in the generated frequency. At the same time the excitation of the main generator is reduced to prevent an increase in the generated voltage. If the frequency of the generated current tends to fall below normal a reverse operation in the field excitation of the motor and the generator of the main motor-generator set takes place.

A potential is impressed on the grid of the phase-detector tube which varies in accordance with the output from the two amplifier tubes. This potential is impressed upon the grid of the detector tube after a time lag as disclosed in the patent to H. M. Stoller, No. 1,662,085, dated March 13, 1928. A potential is also impressed on the grid of the phase-detector tube in accordance with the load carried by the main generator for compensating the regulating operation in accordance with the load on the main motor-generator set.

The single figure in the accompanying drawing is a diagrammatic view of a regulator system constructed in accordance with the invention.

Referring to the drawing, a motor-generator set 1, comprising a motor 2 and an alternating-current generator 3 is provided for supplying a substantially constant frequency current to a supply circuit comprising conductors 4 and 5. The motor 2 of the motor-generator set is connected across a direct-current supply circuit comprising conductors 6 and 7. The motor 2 comprises an armature 8 and a field-magnet winding 9. The winding 9 is connected across the supply conductors 6 and 7, in series with a resistance element 10. The alternating-current generator 3 comprises an armature 11, which is connected to the output conductors 4 and 5, and a field-magnet winding 12 which is connected across the direct-current supply conductors 6 and 7 in series with a resistance element 13.

An auxiliary motor-generator set 14 is provided for controlling the excitation of the field windings 9 and 12. The auxiliary motor-generator set comprises a shunt-wound direct-current motor 15 which is connected across the supply conductors 6 and 7 and a direct-current generator 16. The direct-current generator comprises an armature 17, one terminal of which is connected to the conductor between the field-magnet winding 9 and the resistance element 10 and the other terminal of which is connected to the conductor between the field-winding 12 and the resistance element 13. A field-magnet 18 is provided for the generator 16 which is controlled in a manner to be hereinafter set forth for governing the auxiliary motor-generator set to maintain a substantially constant frequency output from the generator of the main motor-generator set. The main motor-generator set and the auxiliary generator set operate very similarly to the motor-generator set disclosed in the patent to H. M. Stoller et al., No. 1,548,959.

A Wheatstone bridge circuit 20 is connected across the output conductors 4 and 5 for controlling a phase-detector tube 21. The phase-detector tube 21 is coupled to two thermionic amplifier tubes 22 and 23 for controlling the excitation of the field winding 18. One arm of the Wheatstone bridge circuit 20 comprises an inductance element 24 and a capacity element 25 which are tuned to a frequency the same as that produced by the main generator 11 under normal operating conditions. A resistance element 26 comprises a second arm of the bridge circuit and the primary winding 27 of a transformer 28 comprises the other two arms of the bridge circuit. The secondary winding 29 of the transformer 28 is connected to the output circuit of the phase-detector tube 21 for supplying alternating potential to such tube. The primary winding 27 of the transformer 28 and two opposite vertices of the Wheatstone bridge circuit are connected across the output circuit comprising conductors 4 and 5.

The phase-detector tube 21 comprises an anode 30, a grid element 31, and a cathode 32. The grid element 31 is connected to the secondary winding 33 of the output transformer 34. The primary winding of the output transformer 34 is connected to the vertices of a Wheatstone bridge circuit opposite the vertices connected to the output conductors 4 and 5. The Wheatstone bridge circuit and the phase-detector tube 21 operate in the manner disclosed in the patent to H. M. Stoller, No. 1,711,661, dated May 7, 1929. The output from the phase-detector tube varies in accordance with the phase relation between the alternating potential impressed on the plate 30 and the alternating potential impressed upon the grid 31 from the Wheatstone bridge circuit. The phase of the potential impressed upon the grid from the Wheatstone bridge circuit varies in accordance with the frequency produced by the generator 3 of the main motor-generator set.

The amplifier tube 22 comprises an anode 36, a grid element 37 and a cathode 38. The amplifier tube 23 comprises an anode 39, a grid element 40 and a cathode 41. The amplifier tubes 22 and 23 which are connected in parallel circuit relation with respect to each other have their input circuits coupled to the phase-detector tube 21 by means of a resistance element 42. A condenser 43 is connected across the coupling resistance 42 for storing the plate current pulses to produce a substantially steady D. C. voltage across resistance element 42. A transformer 44 is provided for supplying alternating current to the amplifier tubes 22 and 23 and filament current to the amplifier tubes and the detector tube. The transformer 44 comprises a primary winding 45 which is connected across the output conductors 4 and 5, a secondary winding 46 for supplying space current to the thermionic amplifier 22, a secondary winding 47 for supplying space current to the amplifier tube 23 and three secondary windings 48, 49 and 50 which respectively supply heating current to the filaments 38, 41 and 32.

The field winding 18 for the generator 16 of the auxiliary motor-generator set is connected in the output circuits of the thermionic amplifiers 22 and 23. A condenser 65 is connected across the field winding 18 in order to smooth out fluctuations in the current supply thereto.

Resistance elements 51 and 52 and a condenser 53 are connected to the output circuits of the amplifier tubes 22 and 23 for impressing on the phase-detector grid 31 a potential after a time lag which varies directly in accordance with the output from the amplifier tubes. The potential impressed from the output of the amplifier tubes on the grid of the detector tube stabilizes the operation of the regulator system. This stabilizing feature is disclosed and claimed in the patent to H. M. Stoller, No. 1,662,085.

A transformer 555 is provided for impressing a potential on the grid 31 of the phase-detector tube which varies in accordance with the load on the generator 3 of the main motor-generator 1. The transformer 55 comprises a primary winding 56 which is connected in series with the armature 11 of the generator 3 and a secondary winding 57 which is connected in the feed-back circuit to the grid element of the detector tube. A condenser 58 is connected in series with the output conductors 4 and 5 for neutralizing the reactance of the generator 3.

If the frequency of the current supplied to conductors 4 and 5 from the main generator 3 is raised above normal value the Wheatstone bridge circuit 20 operates the phase-detector tube 21 to decrease the potential impressed across the coupling resistance 42. The decreased potential drop across the resistance element 42 decreases the negative potential impressed on the grids 37 and 40 of the amplifier tubes 22 and 23. The lowering of the negative potential on the grids of the amplifier tubes increases the space current flow therethrough and accordingly increases the excitation of the field magnet winding 18. The increased excitation of the generator 16 in the auxiliary motor-generator set serves to effect current flow through the armature 17 in the direction of the arrow *a*. This current flow through the armature 17 serves to increase the excitation of the main motor field winding 9 and to decrease the excitation of the main generator field winding 12. The speed of the main motor is reduced to reduce the frequency produced by the main generator 3. Simultaneously the voltage produced by the main generator 3 is reduced.

If the frequency produced by the generator 3 tends to fall below normal value the Wheatstone bridge circuit 20 is operated for controlling the detector tube to increase the potential drop across the coupling resistance 42. This increases the negative potential impressed on the grids 37 and 40 of the amplifier tubes. The excitation of the field winding 18 of the generator 16 is reduced to control the auxiliary motor generator set and reduce the excitation of the main motor field winding 19 and increase the excitation of the main generator field winding 12.

A delayed feed-back potential is impressed upon the phase-detector tube from the output circuits of the amplifier tubes to stabilize the regulating operation at the same time a potential is impressed from the output circuit of the main generator in accordance with the load on the generator to compensate for changes in load. The feed-back circuit may be traced from the grid 31 of the detector tube through the secondary winding 33 of the transformer 34, secondary winding 57 of the transformer 55, supply circuit comprises conductors 6 and 7, and resistance elements 52 and 51 and the capacity element 53, which are connected across the output circuits of the thermionic amplifiers 22 and 23 to the cathode 32 of the phase detector tube.

Modifications in the system and in the arrangement and location of parts may be made within the spirit and scope of the invention and such modifications are intended to be covered by the appended claims.

What is claimed is:

1. In a regulator system for a generator, a Wheatstone bridge circuit connected to the generator circuit, a thermionic tube operated by said bridge circuit in accordance with a characteristic of the generator, means controlled by the tube for governing said generator to maintain the characteristic thereof constant, and a feed-back circuit for impressing a potential on the grid of the tube which varies according to the load on the generator.

2. In a regulator system for a generator, a Wheatstone bridge circuit connected to the generator circuit, a thermionic phase-detector tube operated by said bridge circuit in accordance with a characteristic of said generator, means comprising an amplifier operated by said phase-detector tube for controlling said generator to maintain the characteristic thereof constant, and a feed-back circuit for impressing a potential on the phase-detector grid element which varies according to the load on the generator.

3. In a regulator system, a generator, a Wheatstone bridge circuit connected to the generator circuit, a thermionic tube operated by said bridge circuit in accordance with a characteristic of said generator, means comprising an amplifier operated by said tube for controlling said generator to maintain the characteristic thereof constant, and a circuit for impressing a potential on the grid element of the tube which varies according to the output from said amplifier and the load on the generator.

4. In a regulator system, a motor-generator set, a Wheatstone bridge circuit connected to the generator circuit, a thermionic phase-detector tube operated in accordance with a characteristic of the generator, means controlled by said tube for governing said set to maintain the generator characteristic constant, and a compensating circuit for impressing a potential on the grid of the tube which varies according to the generator load.

5. In a regulator system, a motor-generator set, a Wheatstone bridge circuit connected to the generator, a thermionic tube operated by the bridge circuit in accordance with a characteristic of said generator, means comprising an amplifier controlled by said tube for governing the set to maintain the generator characteristic constant, means for impressing a potential on the grid of the tube after a delay to stabilize the regulating operation, and means for impressing a compensating potential on the grid which varies according to the generator load.

6. In a regulator system for a dynamo-electric machine, a thermionic tube operated in accordance with a characteristic of said machine, means controlled by the tube for governing said machine to maintain the characteristic thereof constant, and means for impressing a potential on the grid of the tube which varies according to the load on the machine.

7. In a regulator system for an alternating current generator, a thermionic phase-detector tube operated in accordance with a characteristic of the generator, means controlled by the tube for governing said generator to maintain the characteristic thereof constant, and means for impressing a compensating potential on the grid of the tube which varies according to the load on the generator.

8. In a regulator system for an alternating current generator, a thermionic tube operated in accordance with the generator frequency, means controlled by the tube for governing said generator to maintain the frequency thereof constant, and means for impressing a compensating potential on the grid of the tube which varies according to the load on the generator.

9. In a regulator system a motor-generator set, the generator of said set producing an alternating current, a thermionic tube, means comprising a resonant circuit for operating said tube according to the generator frequency, and means operated by said tube for simultaneously controlling the speed of the motor and the excitation of the generator.

10. In a regulator system, a motor-generator set, the generator of said set producing an alternating current, a thermionic phase-detector tube, means comprising a Wheatstone bridge circuit for operating said tube according to the frequency of said generator, and means operated by said tube for simultaneously controlling the speed of the motor and the excitation of the generator to hold the generator characteristic constant.

11. In a regulator system, a motor-generator set, said generator developing an alternating current, a Wheatstone bridge circuit having one arm thereof tuned to the normal frequency of said generator, two opposite vertices of said bridge being connected across the generator circuit, a thermionic tube having the input circuit thereof connected to the other vertices of said bridge circuit, means for supplying alternating potential to the plate of the tube and means operated by said tube for simultaneously controlling the speed of the motor and the excitation of the generator.

12. In a regulator system for an alternating current generator, a Wheatstone bridge circuit having one arm thereof tuned to the normal frequency produced by said generator, two opposite vertices of said bridge being connected across the generator circuit, a thermionic phase-detector tube having the input circuit thereof connected to the other vertices of the bridge circuit, means for supplying alternating potential to the plate of said tube from the generator, means controlled in accordance with the phase relation between the potentials impressed on the plate and grid of the tube for governing said generator to maintain the frequency thereof constant, and means for impressing a potential on the grid of the tube which varies directly according to the generator load and indirectly with the tube output.

13. In a regulator system for an alternating current generator, a Wheatstone bridge circuit having one arm thereof tuned to the normal frequency produced by said generator, two opposite vertices of said bridge being connected across the generator circuit, a thermionic phase-detector tube having the input circuit thereof connected to the other vertices of said bridge circuit, means for supplying alternating potential to the plate of the tube from the generator, means comprising an amplifier coupled to said tube for governing the generator to maintain the frequency thereof constant, means for impressing a delayed feed-back potential from the amplifier output circuit on the grid element of the phase-detector tube, and means for impressing a potential on the phase-detector grid element which varies according to the load on the generator.

14. In a regulator system, a motor-generator set producing an alternating current, a Wheatstone bridge circuit having one arm tuned to the normal frequency of the generator, two opposite vertices of said bridge being connected across the generator circuit, a thermionic phase-detector tube having the input circuit thereof connected to the other vertices of said bridge, means for supplying alternating potential from the generator to the plate of said tube, a thermionic amplifier coupled to said phase-detector tube and supplied with alternating current from said generator, an auxiliary dynamo-electric machine connected in circuit with the field windings of the motor and generator of said set, and means for controlling said auxiliary machine by said amplifier to maintain the generator frequency constant.

15. In a regulator system for a generator, a three element space discharge device operated in accordance with a characteristic of the generator, means controlled by said device for governing the generator to maintain said characteristic thereof constant, and means for impressing a compensating potential on the grid of the device which varies according to the load on the generator.

16. In a regulator system for a generator, a three element space discharge device operated in accordance with a characteristic of the generator, means comprising an amplifier controlled by said device for governing said generator to maintain the characteristic thereof constant, means for impressing a potential on the grid of the device which varies according to the load on the generator, and means for impressing a potential on the grid of the device which varies according to the output of said amplifier.

17. In a regulator system for a dynamo-electric machine, a space discharge device operated in accordance with a characteristic of the machine, means controlled by said device for governing said machine to maintain said characteristic thereof constant, and means for compensating said device according to the load on said machine.

In witness whereof, I hereunto subscribe my name this 16th day of February, 1929.

HUGH M. STOLLER.